Sept. 28, 1965 G. BERGSON 3,208,644
FLUID METERING APPARATUS
Filed Nov. 29, 1963 4 Sheets-Sheet 1
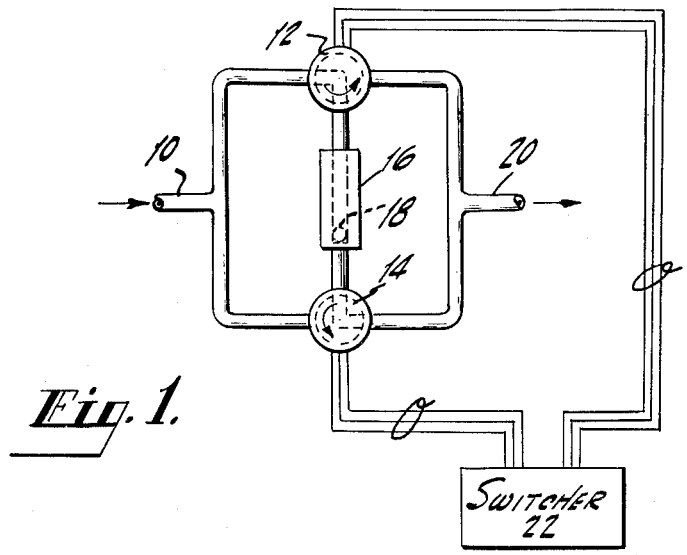
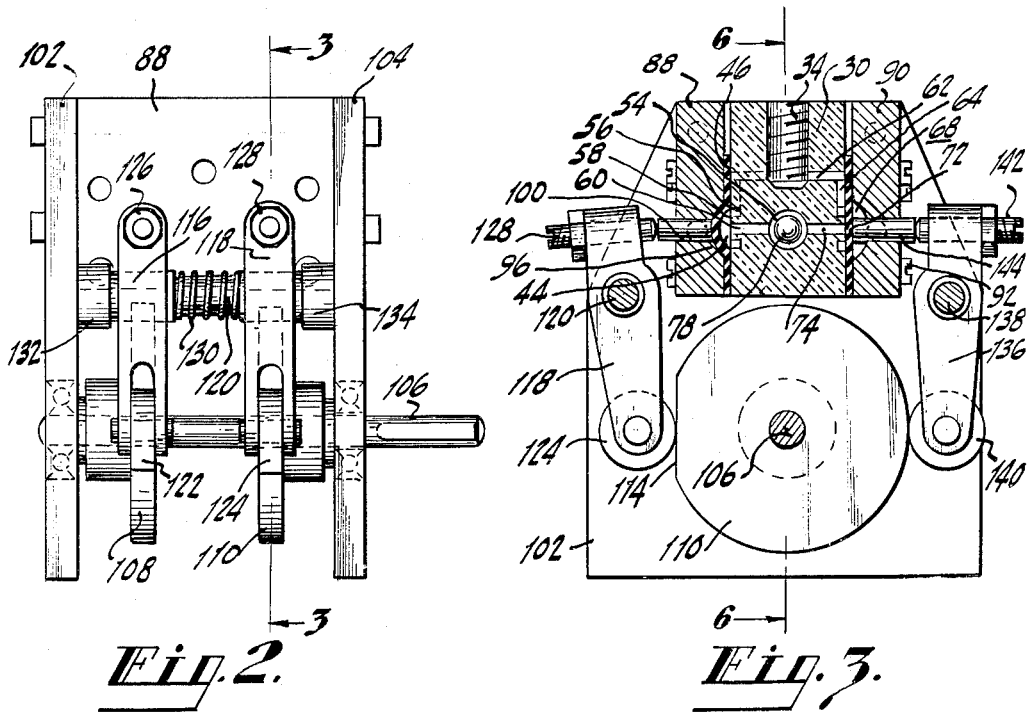
INVENTOR.
GUSTAV BERGSON
BY
Eugene M. Whitacre
Attorney Sept. 28, 1965  G. BERGSON  3,208,644
FLUID METERING APPARATUS
Filed Nov. 29, 1963  4 Sheets-Sheet 2
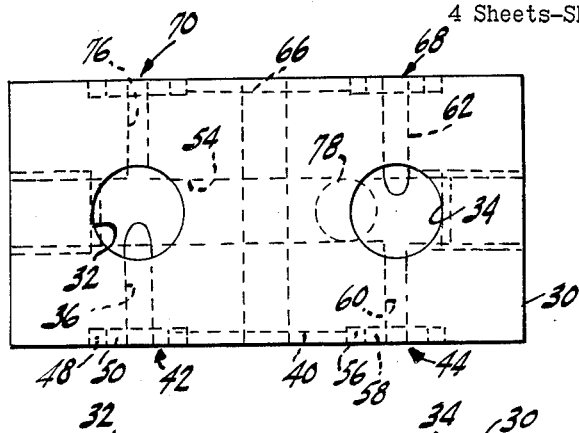
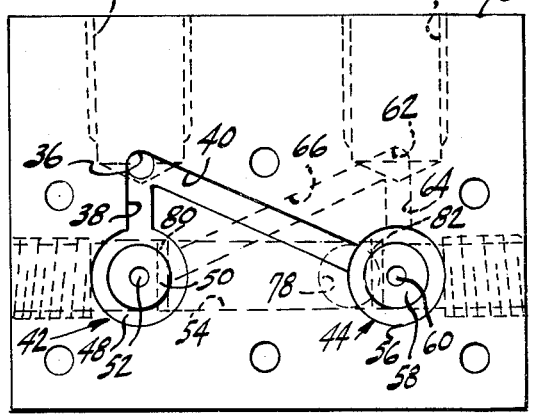
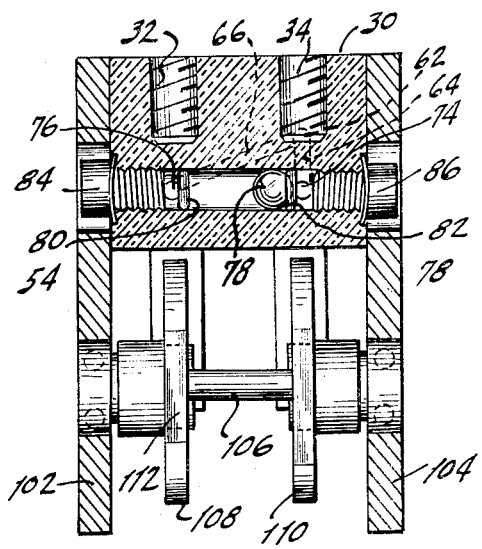
INVENTOR.
GUSTAV BERGSON
BY
Eugene M. Whitman
Attorney Sept. 28, 1965  G. BERGSON  3,208,644
FLUID METERING APPARATUS
Filed Nov. 29, 1963  4 Sheets-Sheet 3

INVENTOR.
GUSTAV BERGSON
BY
Eugene M. Whitacre
Attorney

Sept. 28, 1965 G. BERGSON 3,208,644
FLUID METERING APPARATUS
Filed Nov. 29, 1963 4 Sheets-Sheet 4
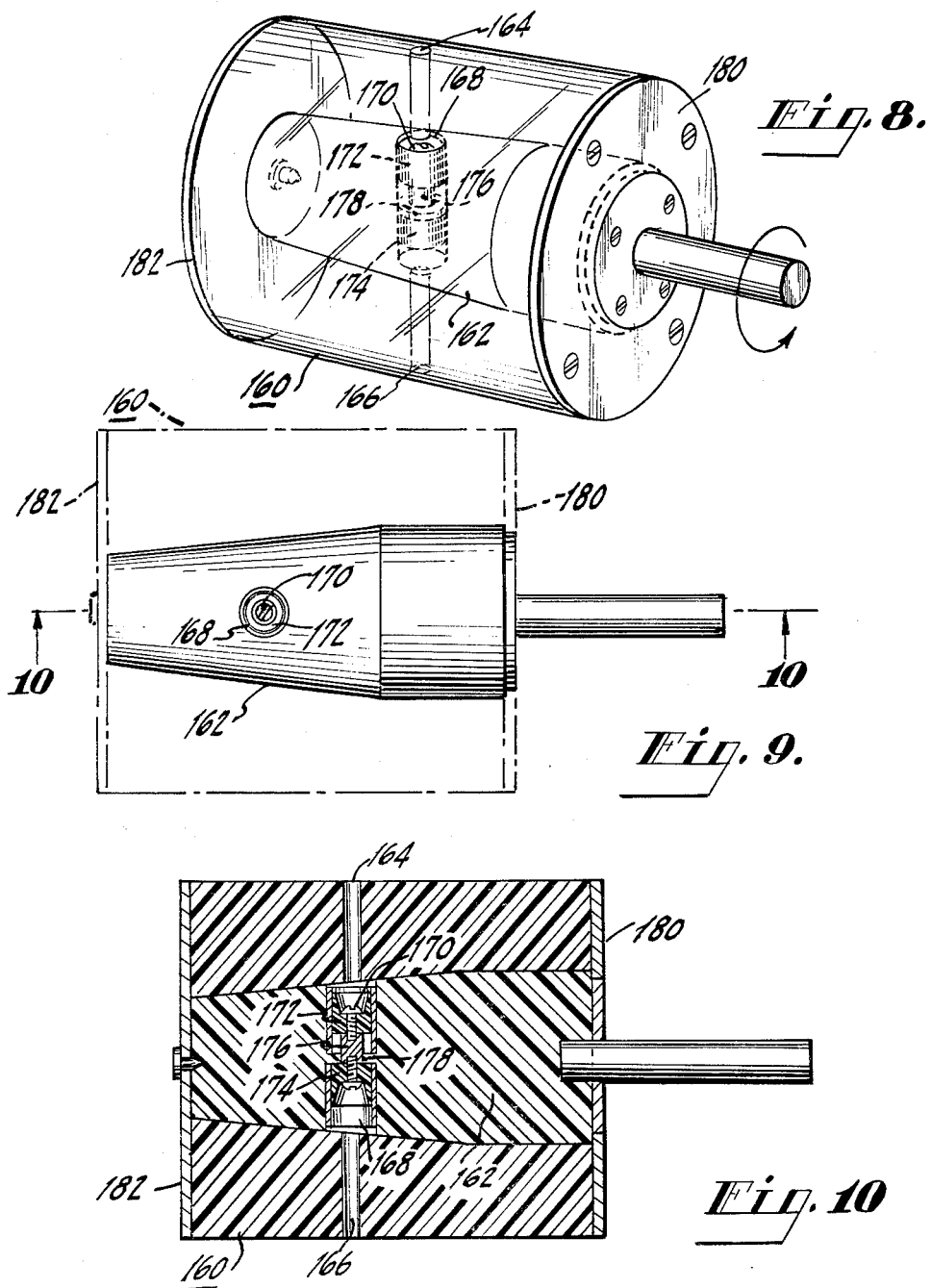
INVENTOR.
GUSTAV BERGSON
BY Eugene M. Whitacre
ATTORNEY United States Patent Office 3,208,644
Patented Sept. 28, 1965

3,208,644
FLUID METERING APPARATUS
Gustav Bergson, Apt. 319, Benson Apts.,
Jenkintown, Pa.
Filed Nov. 29, 1963, Ser. No. 326,823
7 Claims. (Cl. 222—249)

This invention relates to fluid metering apparatus and more particularly to apparatus for precision control of the flow rate of a fluid such as a liquid or a gas.

For certain purposes, such as in chemical processes and the like, it is often desirable to meter, or provide accurate control of the flow rate of a fluid being used. Systems for automatically controlling the fluid flow at relatively high rates have heretofore been provided; however, when the rate of flow of the fluid to be controlled is very low, such as on the order of one cubic centimeter per minute (1 cc./min.) for liquids, known types of flow rate control systems are unstable and permit wide variations in the flow rate of the fluid being controlled.

It is accordingly an object of this invention to provide precision fluid metering systems for controlling the flow of a fluid such as a liquid.

It is another object of this invention to provide a precision control system for regulating the flow of fluid such as a liquid at stable rates of flow down to 1 cc./min., or less, for liquids.

A further object of this invention is to provide an improved fluid flow rate controller which is economical to manufacture, and simple to adjust and operate.

A metering system in accordance with the invention includes an elongated chamber, which may for example, be of circular cross section. A system of valves is provided which connects both ends of the chamber to the fluid inlet port and to the fluid outlet port. Operating means for controlling the valves sequentially establishes two different fluid flow paths from the inlet port to the outlet port through the chamber. In the first path the fluid flows in one direction through the chamber, and in the second path the fluid flows in the opposite direction through the chamber. A piston, such as a ball, snugly fits into the chamber, but is free to move so that when the operating means establishes one of the fluid flow paths, the piston is driven from one end of the chamber to the other under the pressure of the fluid from the inlet port. In so doing the piston drives a known quantity of fluid out of the chamber to the outlet port. When the operating means establishes the other fluid flow path, the piston is driven back through the chamber causing a like quantity of fluid to be driven to the outlet port. By controlling the rate at which the operating means sequentially establishes the first and second fluid flow paths, the rate of fluid flow can be controlled. It has been found that fluid metering systems embodying the invention provide stable precision control of fluids down to extremely low rates of flow, such as, for example, down to 1 cc./min. for liquids.

The novel features which are considered to be characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a simplified schematic flow and electric circuit diagram of a fluid metering system embodying the invention;

FIGURE 2 is a side view of a fluid metering apparatus embodying the invention;

FIGURE 3 is a sectional view taken on the section lines 3—3 of FIGURE 2;

FIGURES 4 and 5 are enlarged side and plan views respectively of that portion of the apparatus shown in FIGURES 2 and 3 including the fluid chamber and the various fluid flow paths;

FIGURE 6 is a sectional view taken on section lines 6—6 of FIGURE 3;

FIGURE 8 is a perspective view of a rotary valve mechanism embodying the invention;

FIGURE 9 is a sectional view taken along the axis of the rotor element of the mechanism shown in FIGURE 8; and FIGURE 10 is a sectional view taken on the section lines 10—10 of FIGURE 9.

Figure 7:
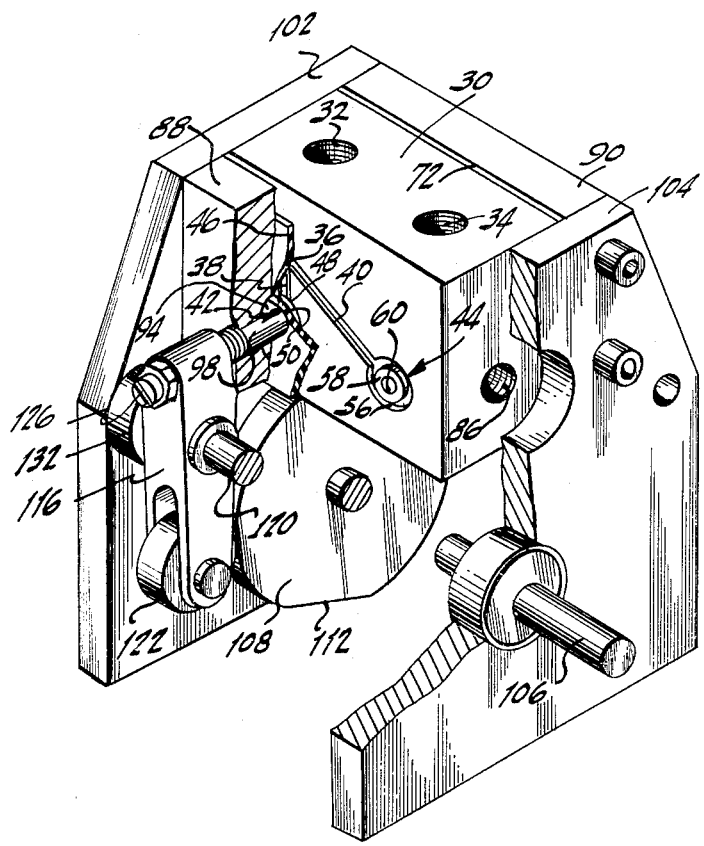
FIGURE 7 is an enlarged perspective view of the apparatus shown in FIGURES 2 and 3 partly broken away to illustrate the operation of the valve system.

Referring now to the drawings, the fluid metering apparatus of FIGURE 1 includes an inlet port 10 which is coupled by parallel conduits or pipes to two multiple position externally controlled valves 12 and 14. An elongated cylindrical chamber 16 of known volume is connected to one port of each of the externally controlled valves 12 and 14. A piston or ball 18 which snugly fits within the chamber 16 controls the amount of fluid which may flow into the chamber. To this end, seating means such as annular washers, not shown, may be mounted at opposite ends of the chamber 16 to limit the travel of the ball 18, and provide a fluid-tight seal when the ball is driven under fluid pressure against one of the washers.

An outlet port 20 is coupled through parallel conduits or pipes to the externally controlled valves 12 and 14.

The externally controlled valves 12 and 14 are operable to assume either one of two positions in response to a control signal from an actuator shown as an electrical switcher 22. In a first position, the valve 12 connects the inlet port 10 to the chamber 16, and the valve 14 connects the chamber 16 to the outlet port 20 as shown in FIGURE 1. In the alternate position, the valve 14 connects the inlet port 10 to the chamber 16 and the valve 12 connects the chamber 16 to the outlet port 20.

In operation, when the switcher 22 actuates the valves from the positions shown in FIGURE 1 to their alternate positions, fluid from the inlet port flows through the valve 14 and drives the ball 18 to the end of the chamber 16 which is connected to the valve 12. As the ball 18 moves through the chamber 16, it drives the fluid therein to the outlet port 20 by way of the valve 12. When the ball 18 reaches the opposite end of the chamber, the fluid flow path is blocked, and no more fluid flows through the system until the switcher 22 actuates the valves 12 and 14 back to the positions shown in FIGURE 1. At this time, the inlet port 10 is coupled to the chamber 16 through the valve 12, and the ball is driven under pressure of the fluid back to the position shown in FIGURE 1. As the ball moves through the chambers, the fluid in the path of the travel is displaced through the valve 14 to the outlet port 20.

Since the volume of the chamber 16 is known, the flow rate of fluid from the outlet port 20 can be established at a desired value by controlling the rate of switching of the valves 12 and 14. This system provides accurate control of liquid flow rates, down to 1 cc./min. or less.

The fluid metering apparatus shown in FIGURES 2-7 provides advantages over that shown in FIGURE 1 in cost and efficiency of operation. In this embodiment of the invention, the various fluid flow paths, the fluid chamber, and the stationary portions of the valves are formed in a single block 30 of Lucite or other material which is non-reactive with the fluid to be passed therethrough. The block 30 includes a pair of tapped openings 32 and 34 in the top thereof which provide respectively the fluid inlet and fluid outlet ports. Suitably threaded conduits may be screwed into the opening 32 and 34 for connecting the apparatus to the fluid supply and utilization means.

A passage 36 bored from the front of the block 30 communicates with the inlet opening 32. A pair of grooves 38 and 40 in the front wall of the block extend radially from the passageway 36 to a pair of valves 42 and 44. An elastic diaphragm 46, of rubber or other material which is non-reactive with the fluid being controlled overlies the grooves 38 and 40, and serves as the movable member of the valves 42 and 44.

That portion of the valve 42 built into the block 30 includes an annular grove 48 which is an extension of the groove 38. An annular land 50 within the annular groove 48 serves as a valve seat, and the outlet port of the valve 42 comprises a passageway 52 which extends from the center of the land 50 to one end of a fluid chamber 54 within the block 30. It will be noted that when the diaphragm 46 is pressed against the land 50, no fluid can flow from the annular groove 48 to the passageway 52.

The portion of the valve 44 built into the block 30 is similar to that of the valve 42, and includes an annular groove 56, a land 58, and a passageway 60. The passageway 60 communicates with the opposite end of the fluid chamber 54.

Fluid flow passages to the outlet opening 34 are formed on the opposite side of the block 30, and have the same configuration as those described above. A passageway 62 is bored from the rear of the block 30 to the outlet opening 34. A pair of grooves 64 and 66 in the rear wall of the block 30 extend radially from the passageway 62 to a pair of valves 68 and 70. An elastic diaphragm 72 overlies the grooves.

The valves 68 and 70 are the same construction as the valves 42 and 44. It will be noted that the valve 68 which is directly opposite the valve 44 has an inlet fluid passage 74 which communicates with the fluid chamber 54. The passages 60 and 74 are axially aligned, and may be formed by boring a single hole completely through the block 30. In like manner, the valve 70 is directly opposite the valve 42, and includes an inlet fluid passageway 76 which together with the outlet passage 52 forms a continuous bore through the block 30.

The fluid chamber 54, which is of circular cross-section, is formed by boring a hole from one end of the block to the other. A piston or ball 78 is placed in the chamber, and a pair of seating rings 80 and 82 of resilient material are forced into the fluid chamber 54 so that a fluid tight seal is formed when the ball 78 is forced against one of the rings. The diameter of the ball is such as to snugly fit into the chamber 54 and yet permit free movement of the ball 78.

A pair of threaded plugs 84 and 86 are screwed into the tapped opposite ends of bore which forms the fluid chamber 54. Both of the plugs have annular end sections of reduced diameter which engage and locate the seating rings 80 and 82 respectively. Apertures are provided in the end sections of the plugs 80 and 82 to permit fluid flow from the fluid chamber to the passageways 52, 60, 74 and 76.

A pair of rigid clamping plates 88 and 90, on opposite sides of the block 30 are held in position by six screws 92 which pass through the block 30. The elastic diaphragms 46 and 72 are tightly sandwiched between the block 30 and the clamping plates to provide a gasket and to serve as valve diaphragms. Holes 94 (FIG. 7), and 96 (FIG. 3), in the clamping plate 88 are in registry with the lands 50 and 58 of the valves 42 and 44. The holes 94 and 96 are countersunk on the side of the plate 88 engaging the diaphragm 46. Valve operating pins 98 and 100 are positioned in the holes 94 and 96 respectively. Similar holes and valve operating pins are provided in the clamping plate 90 for operating the valves 68 and 70.

The block 30 is mounted between a pair of end frame members 102 and 104 by a plurality of screws which pass through the end frame members into the clamping plates 88 and 90. A rotatable control shaft 106 extending between the end frame members 102 and 104, supports a pair of spaced cams 108 and 110 each having a flat portion 112 and 114 respectively. A pair of pivotally mounted valve operating levers 116 and 118 are mounted on a shaft 120 extending between the end frame members 102 and 104. Rollers 122 and 124 on one end of the valve operating levers 116 and 118 engage the cams 108 and 110 respectively, and adjustable screws 126 and 128 in the other end of the valve operating levers are positioned to engage the valve operating pins 98 and 100 respectively. A spring 130 maintains the valve operating levers 116 and 118, which freely rotate on the shaft 120, against stops 132 and 134 to maintain the valve operating levers in reference positions.

A similar pair of valve operating levers, one of which 136, is shown in FIGURE 3, are rotatably mounted on a shaft 138 which extends between the end frame members 102 and 104. The valve operating lever 136 includes a roller 140 which engages the cam 110, and an adjustment screw 142 which engages the valve operating pin 144 for the valve 68.

The cams 108 and 110 are fixed on the control shaft 106 so that the flat portions 112 and 114 are 180° apart. In other words with the flat portion 112 of the cam 108 in engagement with the roller 122, the flat portion 114 of cam 110 is in registry with the roller 140.

To adjust the fluid metering apparatus for operation, the cams 108 and 110 are set to a position so that none of the rollers of the valve operating levers are in registry with the flat portions 112 and 114 of the cams. The four adjustable screws, such as screws 126, 128 and 142, are then turned in so that the valve operating pins which they respectively engage force the elastic diaphragm members against the lands of the valves 42, 44, 68 and 70. For example, as shown in FIGURE 7 the adjustable screw 126 is turned clockwise to force the valve operating pin 98 against the elastic diaphragm 46, so that the diaphragm 46 tightly engages the land 50 of the valve 42.

With suitable pipes or tubing connected to the fluid inlet and outlet openings, the apparatus is ready for operation. Assume that the apparatus has been operating for a sufficient period of time so that the various passageways are filled with fluid. When the rollers on the valve operating levers do not engage the flat portions 112 and 114, all of the valves are tightly closed, and no fluid flows. Assume that the shaft is rotating in a clockwise direction as viewed in FIGURE 3 and is in an angular position to bring the flat 112 of the cam 108 next into engagement with the roller 122 of the valve operating lever 116, and the flat 114 of the cam 110 into engagement with roller 140 of the valve operating lever 136. Further assume that the ball 78 is against the seating ring 80.

When the flats 112 and 114 are in registry with the rollers 122 and 140, the valve operating levers 116 and 136 can rotate slightly to release the elastic diaphragms associated with the valves 42 and 68. It should be noted that the valves 44 and 70 remain tightly closed. Fluid under pressure then flows from the inlet opening 32 through the passageway 36 and groove 38 to the annular groove 48. The fluid pressure forces the elastic diaphragm 46 into the countersunk portion of the hole 94 in the clamping plate 88 so that the fluid flows over the land 50 into the passageway 52. The fluid pressure moves the ball 78 from its position against the seating ring 80, through the fluid chamber 54 until the ball stops further fluid flow by seating against the ring 82.

The fluid driven out of the fluid chamber by movement of the ball 78 flows out the passageway 74 and forces the elastic diaphragm 72 against a countersunk hole in clamping plate 90. The fluid then flows over the land portion of the valve 68, through the groove 64 and passageway 62 to the outlet opening 34.

Continued rotation of the control shaft 106 causes the cams 108 and 110 to bear against the rollers 122 and 140 so that the operating levers 116 and 136 are pivoted in a direction to close the valves 42 and 68. Further clockwise rotation of the control shaft 106 eventually brings the flat portions 112 and 114 of cams 108 and 110 into registry with the rollers for the other two valve operating levers thereby releasing the valve operating pins for the valves 44 and 70.

Under these circumstances fluid from the inlet opening 32 flows through the passageway 36 and the groove 40 to the annular groove 56. The fluid pressure forces the elastic diaphragm 46 into the countersunk portion of the hole 96 in the clamping plate 88, as shown in FIGURE 3, so that fluid flows over the land 58 into the passageway 60. The fluid pressure then forces the ball 78 from its position against the seating ring 82 through the fluid chamber back to its original position against the seating ring 80. After the ball 78 engages the seating ring 80 no further fluid may flow through the system.

The fluid driven out of the fluid chamber 54 by the ball 78 flows through the passageway 76 and deforms the elastic diaphragm 72 into the countersunk hole of the clamping plate 90. The fluid then flows over the land portion of the valve 70 through the groove 66 and passageway 62 to the outlet opening 34.

Further rotation of the control shaft 106 causes the valves 44 and 70 to be closed. With the control shaft continuously rotated, the process continues, with the valves 42 and 68 being opened for a period of time and then the valves 44 and 70 being opened for a period of time.

Since the amount of liquid displaced per valve operation can be readily determined, the fluid flow rate can be established at a desired rate by controlling the speed of rotation of the control shaft 106. A significant advantage of the apparatus shown in FIGURES 2–7 is that the time that the valves are closed is a significant portion of each rotation of the control shaft 106. This feature reduces the danger of fluid leakage around the ball 78 in the fluid chamber 76, and hence enhances the life and accuracy of the apparatus.

The fluid metering apparatus described herein has been used to control the flow of liquids at rates of the order of 1 cc./min. with excellent short term and long term stability. The apparatus described in FIGURES 2–7 is formed in a unitary block of material which does not react with the liquid being metered. It can be seen that this apparatus provides a significant improvement in economy and ease of construction over known types of flow rate controllers using differential pressure regulators and valves which must be constructed of non-corrosive material. In addition, the known types of flow rate controllers do not approach the flow rate stability, at low rates of flow, of the apparatus described.

Another embodiment of the invention is shown in FIGURES 8–10. In this embodiment of the invention a cylindrical block 160 has a central bore for receiving a rotatable plug 162. Fluid inlet and outlet ports 164 and 166 respectively are provided in opposite sides of the block 160 and each includes a passageway which communicates with the central bore.

The fluid chamber 168 extends through the rotatable plug 162 so that the fluid chamber provides a fluid channel between the inlet and outlet ports once for each 180° of rotation of the plug 162. A piston 170 is mounted in the chamber 168. As shown in FIGURE 10, the piston comprises a pair of washers 172 and 174 which provides liquid tight seals. The washers are affixed by screws to a cylindrical spacer 176. Movement of the piston in either direction is limited by a web 178 annularly extending about the center of the chamber 168.

In operation fluid admitted under pressure to the inlet port 164 cannot flow until the plug 162 is rotated to line up the chamber 168 with the inlet and outlet ports. At this point it should be noted that liquid tight seals, shown as end plates 180 and 182, are provided at opposite ends of the block 160. If desired fluid under pressure may be admitted through one of the end plates to minimize leakage. When the chamber 168 lines up with the inlet and outlet ports, the piston 170 is driven by fluid pressure to its opposite position causing fluid to be forced out the outlet port 166. A further 180° rotation of the plug 162 brings the opposite end of the chamber 168 into registry with the inlet port 164. The fluid then drives the piston 170 back to its original position. In so doing fluid is forced out of the chamber through the outlet port 166. By controlling the speed of rotation of the plug 162, the liquid flow rate can be accurately and stably controlled down to very low rates of flow such as of the order of 1 cc./min. for liquids.

I claim:
1. A fluid metering system comprising in combination,
   a cylindrical fluid chamber of predetermined volume having openings at opposite ends thereof for the inflow and outflow of fluid,
   a freely movable body in said chamber, said body being movable from one end of said chamber to the other under the pressure of fluid admitted to said chamber and adapted to block further flow of fluid after being moved to a limit position in said chamber,
   an inlet port for connection to a source of fluid,
   an outlet port for fluid from said chamber,
   a first valve connected in a fluid flow path between said inlet port and one end of said chamber,
   a second valve connected in a fluid flow path between said inlet port and the opposite end of said chamber,
   a third valve connected in a fluid flow path between said outlet port and said opposite end of said chamber,
   a fourth valve connected in a fluid flow path between said outlet port and said one end of said chamber, and
   operating means for sequentially (1) opening said first and third valves while maintaining said second and fourth valves closed, and (2) opening said second and fourth valves while maintaining said first and third valves closed, said operating means closing all of said valves after the opening of one set of valves and before the opening of the next set.

2. A fluid metering system as defined in claim 1 wherein the period that the first, second, third and fourth valves are closed is longer than the period that any set of valves is opened.

3. Fluid metering apparatus comprising,
   a block of material which is substantially non-reactive with fluid to be metered,
   fluid inlet and outlet openings formed in said block,
   an elongated fluid chamber formed in said block,
   a movable piston positioned in said chamber, said piston being movable from one end of said chamber to the other under the pressure of fluid admitted to said chamber and adapted to block further flow of fluid after being moved to a limit position in said chamber,
   first and second fluid flow paths formed in said block between said inlet opening and opposite ends of said chamber respectively,
   third and fourth fluid flow paths formed in said block between said outlet openings and opposite ends of said chamber respectively,
   each of said first, second, third and fourth fluid flow paths including a portion comprising a groove in the surface of said block, with each of said grooves being interrupted to provide a land area,
   diaphragm means engaging the surface of said block to contain the fluid in said grooves and movable to engage any one of said land areas to block the flow of fluid in the fluid flow path with which that land area is associated, or movable away from said land areas to permit the flow of fluid in the fluid flow path with which that land area is associated, and operating means connected with said diaphragm means for selectively establishing fluid flow from said inlet opening to said outlet opening in opposite directions through said chamber.

4. Fluid metering apparatus comprising, a block of material which is substantially non-reactive with fluid to be metered, fluid inlet and outlet openings formed in said block, a cylindrical fluid chamber formed in said block, a movable ball in said chamber, said ball being movable from one end of said chamber to the other under the pressure of fluid admitted to said chamber and adapted to block further flow of fluid after being moved to a limit position in said chamber, first and second fluid flow paths formed in said block between said inlet opening and opposite ends of said chamber respectively, third and fourth fluid flow paths formed in said block between said outlet opening and opposite ends of said chamber respectively, each of said first, second, third and fourth fluid flow paths including a portion comprising an annular groove defining an annular land area in the surface of said block, with each of said fluid flow paths being continued by a passageway in said block extending to said land area, diaphragm means engaging the surface of said block to contain the fluid in said grooves and movable to engage any one of said land areas to block the flow of fluid in the fluid flow path with which that land area is associated, or movable away from said land areas to permit the flow of fluid in the fluid flow path with which that land area is associated, and operating means connected with said diaphragm means for selectively establishing first and second flow paths from said inlet opening to said outlet opening in opposite directions through said chamber.

5. Fluid metering apparatus as defined in claim 4 wherein said operating means maintains all of said fluid flow paths cut off in the interval between the establishment of said first and second flow paths from said inlet opening to said outlet opening.

6. A fluid metering system comprising in combination:
 (a) An elongated fluid chamber of predetermined volume,
 (b) a moveable rigid body in said chamber,
 (c) first and second valve means respectively coupled to first and second opposite ends of said chamber,
 (d) fluid inlet means which includes a fluid inlet port and first fluid conveying means coupled between said inlet port and said first and second valve means,
 (e) fluid outlet means which includes a fluid outlet port and second fluid conveying means coupled between said outlet port and said first and second valve means and
 (f) means for operating said valves in sequence to enable fluid in said system to flow in a direction from said fluid inlet means toward said fluid outlet means via, alternately,
  (i) said first valve means, said chamber and said second valve means in sequence and then
  (ii) said second valve means, said chamber and said first valve means in sequence.

7. A fluid metering system according to claim 6 wherein the only fluid applied to and leaving said system via said inlet means and outlet means respectively is a predetermined liquid and wherein said rigid body is a piston.

References Cited by the Examiner

UNITED STATES PATENTS

| | | | |
|---|---|---|---|
| 1,646,567 | 10/27 | Weber | 222—250 |
| 1,904,829 | 4/33 | Hurlbrink | 222—249 X |
| 2,124,073 | 7/38 | Maclean et al. | 222—250 |
| 2,795,359 | 6/57 | Lehman | 222—249 |
| 2,881,958 | 4/59 | Sheen | 222—504 |
| 3,125,136 | 3/64 | Miller et al. | 222—250 X |

FOREIGN PATENTS

| | | |
|---|---|---|
| 737,367 | 3/32 | France. |
| 1,077,943 | 5/54 | France. |
| 271,154 | 10/50 | Switzerland. |

LOUIS J. DEMBO, *Primary Examiner.*

HADD S. LANE, *Examiner.*